US012332124B2

(12) United States Patent
Liu et al.

(10) Patent No.: US 12,332,124 B2
(45) Date of Patent: Jun. 17, 2025

(54) DEEP WELL GROUNDING ELECTRODE AND DEEP WELL GROUNDING ELECTRODE MONITORING SYSTEM

(71) Applicants: ELECTRIC POWER RESEARCH INSTITUTE. CHINA SOUTHERN POWER GRID, Guangdong (CN); CHINA SOUTHERN POWER GRID, Guangdong (CN)

(72) Inventors: Gang Liu, Guangdong (CN); Lu Qu, Guangdong (CN); Yi Zhang, Guangdong (CN); Shangmao Hu, Guangdong (CN); Taishan Hu, Guangdong (CN); Minchuan Liao, Guangdong (CN); Lei Jia, Guangdong (CN); Licheng Li, Guangdong (CN); Hong Rao, Guangdong (CN); Hansheng Cai, Guangdong (CN); Ruifa Feng, Guangdong (CN); Hao Liu, Guangdong (CN); Qi Mei, Guangdong (CN); Jian Shi, Guangdong (CN); Ruihan Qi, Guangdong (CN)

(73) Assignees: ELECTRIC POWER RESEARCH INSTITUTE, CHINA SOUTHERN POWER GRID, Guangdong (CN); CHINA SOUTHERN POWER GRID, Guangdong (CN)

( * ) Notice: Subject to any disclaimer, the term of this patent is extended or adjusted under 35 U.S.C. 154(b) by 655 days.

(21) Appl. No.: 17/638,807

(22) PCT Filed: Jul. 24, 2020

(86) PCT No.: PCT/CN2020/103908
§ 371 (c)(1),
(2) Date: Feb. 26, 2022

(87) PCT Pub. No.: WO2021/036608
PCT Pub. Date: Mar. 4, 2021

(65) Prior Publication Data
US 2022/0334005 A1    Oct. 20, 2022

(30) Foreign Application Priority Data
Aug. 26, 2019    (CN) .................. 201910789076.X

(51) Int. Cl.
*G01K 1/08*    (2021.01)
*G01K 11/32*    (2021.01)
(Continued)

(52) U.S. Cl.
CPC ............. *G01K 11/32* (2013.01); *G01K 1/08* (2013.01); *G01K 1/10* (2013.01); *G01K 1/12* (2013.01)

(58) Field of Classification Search
CPC . G01K 11/23; G01K 1/08; G01K 1/10; G01K 1/12
See application file for complete search history.

(56) References Cited

U.S. PATENT DOCUMENTS 2,083,799 A * 6/1937 Roberts .................. C10G 33/02
204/671
4,400,259 A * 8/1983 Schutt ..................... C23F 13/02
204/196.36
(Continued)

FOREIGN PATENT DOCUMENTS

CN           85108190 A *  7/1986  ............... E02D 5/76
CN          1848526 A     10/2006
(Continued)

OTHER PUBLICATIONS

U.S. Appl. No. 17/638,807, filed Oct. 7, 2024_CN_109137919_A_H.pdf, Jan. 4, 2019.*
(Continued)

*Primary Examiner* — Gail Kaplan Verbitsky

(74) *Attorney, Agent, or Firm* — Yue (Robert) Xu; Apex Attorneys at Law, LLP

(57) ABSTRACT

A deep well grounding electrode and a deep well grounding electrode monitoring system. The deep well grounding electrode comprises a feeding rod, a feeding head, a steel casing, a temperature measurement optical cable, an exhaust pipe, and a drainage cable; the steel casing is located in the well body; the feeding head is located at the bottom of the steel casing; the feeding rod, the temperature measurement optical cable, the exhaust pipe, and the drainage cable are located in the steel casing; the temperature measurement optical cable extends from a bottom end of the feeding rod to a monitoring module; the exhaust pipe extends from the bottom end of the feeding rod to the ground; and one end of the drainage cable is welded on the feeding rod, the other end extends to the monitoring module, and the drainage cable is fixed to the feeding rod by bolts.

12 Claims, 3 Drawing Sheets

(51) Int. Cl.
*G01K 1/10* (2006.01)
*G01K 1/12* (2006.01)

(56) References Cited

U.S. PATENT DOCUMENTS

| | | | | | |
|---|---|---|---|---|---|
| 4,400,289 | A | * | 8/1983 | Geldner | C23G 1/025 510/508 |
| 4,501,325 | A | * | 2/1985 | Frazier | E21B 49/086 166/250.01 |
| 4,709,375 | A | * | 11/1987 | Robinton | G01R 21/133 375/244 |
| 4,786,388 | A | * | 11/1988 | Tatum, Jr. | C23F 13/02 174/6 |
| 5,026,468 | A | * | 6/1991 | Carpenter | C23F 13/06 204/196.27 |
| 5,080,773 | A | | 1/1992 | Tatum, Jr. et al. | |
| 6,196,316 | B1 | * | 3/2001 | Bosma | C04B 24/42 166/292 |
| 7,086,484 | B2 | * | 8/2006 | Smith, Jr. | E21B 47/07 175/11 |
| 2003/0196815 | A1 | * | 10/2003 | Crawford | E21B 43/168 166/105 |
| 2010/0218912 | A1 | * | 9/2010 | Lawless | F24T 10/17 165/45 |
| 2014/0190691 | A1 | * | 7/2014 | Vinegar | C10G 9/24 166/272.1 |

FOREIGN PATENT DOCUMENTS

| | | | | |
|---|---|---|---|---|
| CN | 103517965 A | * | 1/2014 | C10B 33/003 |
| CN | 205104914 U | * | 3/2016 | |
| CN | 106813803 A | * | 6/2017 | |
| CN | 109103621 A | | 12/2018 | |
| CN | 109137919 A | * | 1/2019 | E02D 15/00 |
| CN | 109295976 A | | 2/2019 | |
| CN | 209144815 U | * | 7/2019 | E02D 15/00 |
| CN | 209144816 U | * | 7/2019 | E02D 15/00 |
| CN | 110086062 A | | 8/2019 | |
| CN | 109103621 B | * | 12/2019 | H01R 4/66 |
| CN | 110600901 A | | 12/2019 | |
| CN | 210576509 U | | 5/2020 | |
| CN | 109488370 B | * | 11/2020 | E21B 33/13 |
| CN | 115595163 A | * | 1/2023 | |
| CN | 109295976 B | * | 1/2024 | E02D 15/00 |
| RU | 2281593 C1 | * | 8/2006 | |

OTHER PUBLICATIONS

U.S. Appl. No. 17/638,807, filed Oct. 7, 2024_CN_109295976_B_H.pdf,Jan. 30, 2024.*
U.S. Appl. No. 17/638,807, filed Oct. 7, 2024_CN_109488370_B_H.pdf,Nov. 10, 2020.*
U.S. Appl. No. 17/638,807, filed Oct. 7, 2024_CN_209144815_U_H.pdf,Jul. 23, 2019.*
U.S. Appl. No. 17/638,807, filed Oct. 7, 2024_CN_209144816_U_H.pdf,Jul. 23, 2019.*
U.S. Appl. No. 17/638,807, filed Oct. 9, 2024_CN_103517965_A_H.pdf,Jan. 15, 2014.*
U.S. Appl. No. 17/638,807, filed Oct. 7, 2024_CN_115595163_A_H.pdf,Jan. 13, 2023.*
U.S. Appl. No. 17/638,807, filed Oct. 7, 2024_CN_85108190_A_H.pdf,Jul. 2, 1986.*
U.S. Appl. No. 17/638,807, filed Feb. 18, 2025_CN_106813803_A_H.pdf,Jun. 9, 2017.*
U.S. Appl. No. 17/638,807, filed Feb. 18, 2025_CN_109103621_B_H.pdf,Dec. 20, 2019.*
U.S. Appl. No. 17/638,807, filed Feb. 18, 2025_CN_205104914_U_H.pdf,Mar. 23, 2016.*
International Search Report for PCT/CN2020/103908 mailed Sep. 29, 2020, ISA/CN.

* cited by examiner

DEEP WELL GROUNDING ELECTRODE AND DEEP WELL GROUNDING ELECTRODE MONITORING SYSTEM

The present disclosure is a national phase application of PCT international patent application PCT/CN2020/103908, filed on Jul. 24, 2020 which claims priority to Chinese Patent Application No. 201910789076.X, titled "DEEP WELL GROUNDING ELECTRODE AND DEEP WELL GROUNDING ELECTRODE MONITORING SYSTEM", filed on Aug. 26, 2019 with the China National Intellectual Property Administration, which is incorporated herein by reference in its entirety.

FIELD

The present disclosure relates to the technical field of direct current electricity transmission, and in particular to a deep well grounding electrode and a monitoring system for the deep well grounding electrode.

BACKGROUND

A grounding electrode is a key component in a monopolar ground operation in a direct current electricity transmission (DC electricity transmission) project. At present, the grounding electrode technology applied in the DC electricity transmission project mainly includes two types: horizontal grounding electrode and vertical grounding electrode (shallow buried). These two grounding electrode technologies are mostly constructed in the earth surface or a place in the shallow layer with low electrical resistivity, and both choose to diffuse current in the earth surface. The current is diffused in both the vertical and horizontal directions, where the horizontal diffusion has a great impact on the environment of the earth surface, such as a DC magnetic bias of a grounded transformer at the center point, accelerated corrosion of shallow buried metals (pipes, buildings (structures)), etc. In addition, a large amount of land will be occupied due to the limitation of the vertical contact area.

The concept of "deep well grounding electrode" in the prior art mostly refers to a vertical grounding electrode within a depth of 100 m, such as (1) a combined deep well grounding electrode in DC electricity transmission, which is connected to a drainage cable by multiple good conductors, and carbon-based fillers are filled between the drainage cable and an exhaust pipe that constitute the body; (2) a method to construct the deep well grounding electrode in DC electricity transmission which introduce the current into deep underground conductive layer by coke in order to prevent the grounding electrode current from diffusing on the earth surface; (3) a new type of direct buried deep well grounding electrode, a grounding electrode body is arranged inside a well body, where said direct buried deep well grounding electrode is composed of a grounding electrode tube body and a grounding electrode lead, and is filled with antiseptic and resistance reducing agent. In the current practical engineering application, buried depths of the grounding electrodes mentioned in the method are relatively shallow, mostly within a depth of tens of meters, and it is impossible to construct a deep well grounding electrode with a depth of several hundred meters or even thousands of meters according to the above design scheme.

Therefore, there is an urgent need for a deep well grounding electrode and a monitoring system for the deep well grounding electrode.

SUMMARY

A deep well grounding electrode and a monitoring system for the deep well grounding electrode are provided according to embodiments of the present disclosure in order to enhance the diffusion of direct current in deep strata with good conductivity, and greatly reduce the impact of the grounding electrode on the environment of the earth surface.

A deep well grounding electrode is provided according to the first embodiment of the present disclosure, and the deep well grounding electrode is located in a well body, where the deep well grounding electrode includes a feeding rod, a feeding head, a steel casing with a diameter smaller than a bore diameter of the well body, a temperature measuring optical cable, an exhaust pipe and a drainage cable;

the steel casing is located inside the well body, a distance between the top of the steel casing and the ground is defined as a first clearance distance, and an insulation and the outside of the steel casing is coated with an anti-corrosion layer from a certain depth to the top;

the feeding head is located at the bottom of the steel casing, and the feeding head includes a grouting device configured to pump coke slurry;

the feeding rod, the temperature measuring optical cable, the exhaust pipe and the drainage cable are located inside the steel casing;

a distance between the top of the feeding rod and the ground is defined as a second clearance distance, and the feeding rod extends by the second clearance distance from the bottom of the steel casing;

the temperature measuring optical cable extends from the bottom end of the feeding rod to a monitoring module;

the exhaust pipe extends from the bottom end of the feeding rod to the ground;

one end of the drainage cable is welded to the feeding rod by an exothermic welding point, and the other end the drainage cable extends to the monitoring module, and the drainage cable is fixed on the feeding rod by a bolt.

In an embodiment, the bottom of the steel casing is a perforated flower tube structure.

In an embodiment, a certain depth is defined as an insulation depth, a section of the deep well grounding electrode from the ground to the insulation depth is defined as an insulation section, and a section of the deep well grounding electrode from the insulation depth to the bottom of the steel casing is defined as a diffusing section; the insulation section is filled with gravel; the diffusing section is filled with coke.

In an embodiment, an anti-corrosion casing is covered on the outside of the insulation and anti-corrosion layer, and the anti-corrosion casing is a PE casing.

In an embodiment, the deep well grounding electrode includes three drainage cables, each of which shares ⅓ of a rated grounding current value;

the three cables are exothermic welded with the feeding rod at three depths of 400 m, 600 m and 800 m of the well body, respectively, and the exothermic welding points are sealed with lead and coated with epoxy resin.

In an embodiment, the temperature measuring optical cable is fixed on the feeding rod by a hoop.

A deep well grounding electrode is provided according to the second embodiment of the present disclosure, and the monitoring system includes the deep well grounding electrode according to any item in the first embodiment of the present disclosure, and further includes the monitoring module;

where the monitoring module includes a downhole grouting control unit, a downhole exhaust control unit and a downhole temperature monitoring unit;

the downhole grouting control unit is configured to control the grouting device to grout;

the downhole exhaust control unit is configured to control the exhaust pipe to exhaust gas;

the downhole temperature monitoring unit is configured to monitor downhole temperature data collected by the temperature measuring optical cable, and provide an early warning according to a preset temperature threshold.

Compared with the prior art, the deep well grounding electrode and the monitoring system for the deep well grounding electrode provided by the embodiments of the present disclosure have the following beneficial effects:

1. A deep borehole is isolated into an upper insulation section and a lower diffusing section, and a low-carbon alloy steel feeding rod of the same length as the borehole depth is adopted to lead the current to the bottom of the borehole. Insulating treatment is performed on the upper part of the feeding rod to form the insulation section, and the diffusing section is controlled to reduce the diffusion of surface stray currents; coke mixture is injected into the diffusing section in the deep well by grouting at the bottom of the deep well, and an electron circulation path is established between the feeding rod and the stratum by the coke; the perforated exhaust pipe is designed to be wound with geotextile so as to discharge the gas generated during feeding process at the bottom of the well in order to prevent the occurrence of "gas resistance phenomenon"; current in the DC electricity transmission can be quickly lead from one end (e.g. a receiving end) to a layer deep in the earth with good conductivity, and conducted through the deep part of the earth, and then transmitted out from the other end (e.g. a sending end) so as to form a current circulation loop; the inflow and outflow of the current in DC electricity transmission in the shallow layer of the earth are both realized by the feeding rod; after an insulating treatment to the upper part of the feeding rod, the current cannot diffuse directly to the earth surface from the feeding rod, and a high resistance layer covered on the diffusing section can prevent the current in deep layer from flowing into the earth surface, so that a small surface diffusion current and a low potential difference in a large range can be realized, thereby greatly reducing the impact of the grounding electrode on environment of the earth surface;

2. The temperature measuring optical cable is configured to monitor the temperature rise in the downhole during the feeding process. The downhole temperature monitoring unit is configured to automatically alarm when the temperature reaching a preset temperature threshold, and prompt to stop the power operation; the downhole grouting control unit and the downhole exhaust control unit are configured to control the downhole grouting and downhole exhaust, respectively, so as to ensure the stability and safety of the deep well grounding electrode.

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Based on the embodiments of the present disclosure, all other embodiments obtained without creative efforts by those of ordinary skill in the art shall fall within the protection scope of the present disclosure.

Figure 1:
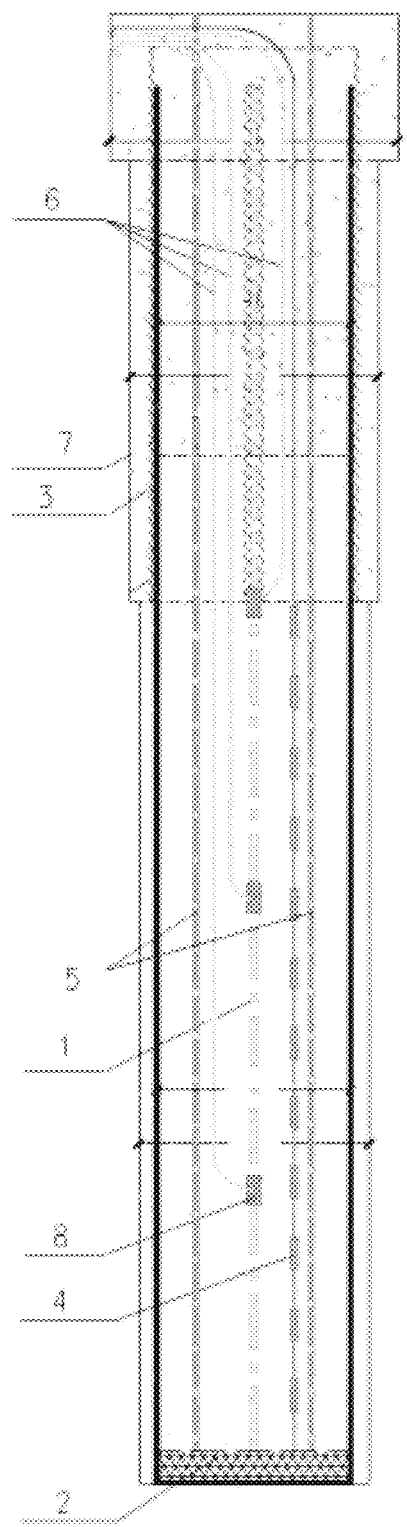
FIG. 1 is a schematic structural view of a deep well grounding electrode provided according to a first embodiment of the present disclosure.

Referring to FIG. 1, which is a schematic structural view of a deep well grounding electrode provided according to an embodiment of the present disclosure, the deep well grounding electrode is located in a well body and includes: a feeding rod (1), a feeding head (2), a steel casing (3) with a diameter less than a wall bore diameter of the well body, a temperature measuring optical cable (4), an exhaust pipe (5) and a drainage cable (6);

the steel casing (3) is located inside the well body, a distance between the top of the steel casing (3) and the ground is defined as a first clearance distance, and an insulation and the outside of the steel casing (3) is coated with an anti-corrosion layer (7) from a certain depth to the top;

the feeding head (2) is located at the bottom of the steel casing (3), and the feeding head (2) includes a grouting device configured to pump coke slurry;

the feeding rod (1), the temperature measuring optical cable (4), the exhaust pipe (5) and the drainage cable (6) are located inside the steel casing (3);

a distance between the top of the feeding rod (1) and the ground is defined as a second clearance distance, and the feeding rod (1) extends by the second clearance distance from the bottom of the steel casing (3);

the temperature measuring optical cable (4) extends from the bottom end of the feeding rod (1) to a monitoring module;

the exhaust pipe (5) extends from the bottom end of the feeding rod (1) to the ground;

one end of the drainage cable (6) is welded to the feeding rod (1) by an exothermic welding point (8), and the other end the drainage cable (6) extends to the monitoring module, and the drainage cable (6) is fixed on the feeding rod (1) by a bolt.

Preferably, a geotextile is adopted to wrap the perforated exhaust pipe.

Further, the bottom of the steel casing (3) is a perforated flower tube structure.

Further, a certain depth is defined as an insulation depth, a section of the deep well grounding electrode from the ground to the insulation depth is defined as an insulation section, and a section of the deep well grounding electrode from the insulation depth to the bottom of the steel casing (3) is defined as a diffusing section. The insulation section is filled with gravel and the diffusing section is filled with coke.

Further, an anti-corrosion casing is sleeved on the outside of the insulation and anti-corrosion layer (7), and the anti-corrosion casing is a PE casing.

Further, the deep well grounding electrode includes three drainage cables (6), each of which shares ⅓ of a rated grounding current value and has a rated current-carrying capacity of no less than 630 A. These three cables are exothermic welded with the feeding rod (1) at three depths of 400 m, 600 m and 800 m of the well body, respectively, and the exothermic welding points are sealed with lead and coated with epoxy resin, so as to achieve anticorrosion of the welding points.

Further, the temperature measuring optical cable (4) is fixed on the feeding rod (1) by a hoop.

Preferably, the temperature measuring optical cable (4) is embodied as a non-metal high-strength borehole temperature measuring optical cable (4).

Further, the deep well grounding electrode further includes an insulation casing; where the insulation casing is covered on the feeding rod (1).

Figure 2:
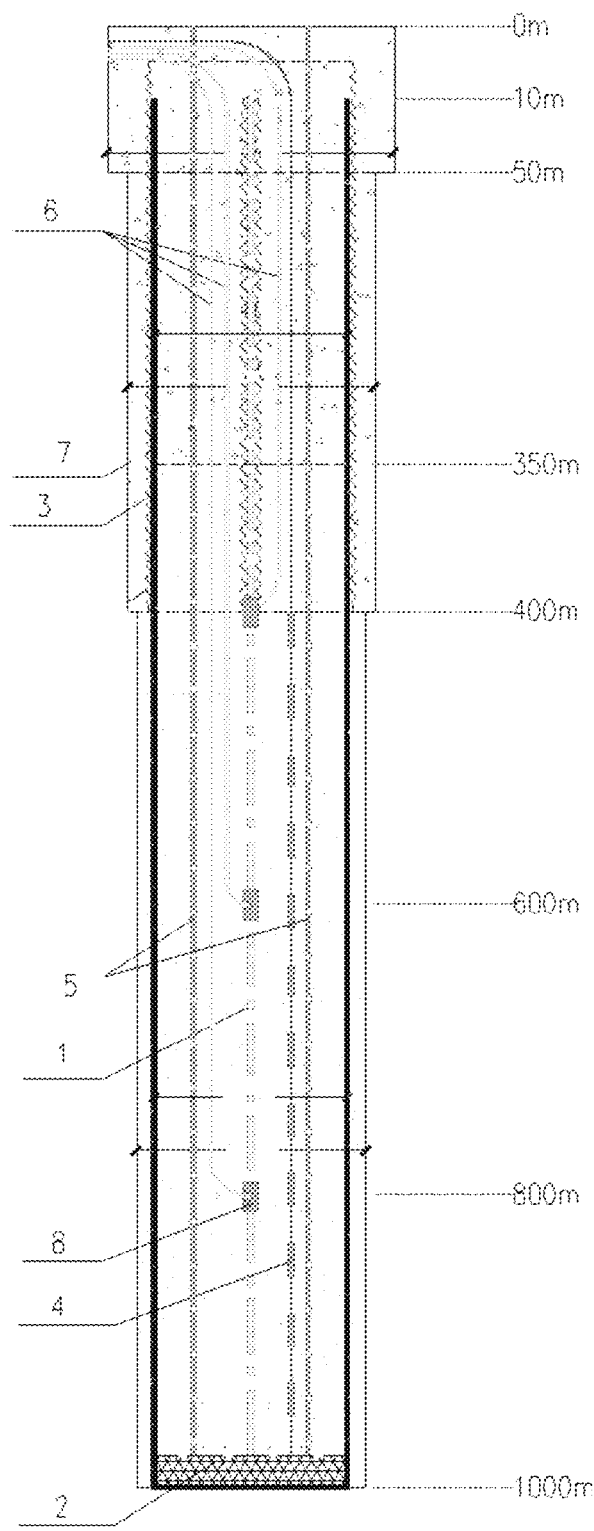
FIG. 2 is a schematic structural view of a deep well grounding electrode provided according to a specific embodiment of the present disclosure.
Figure 3:
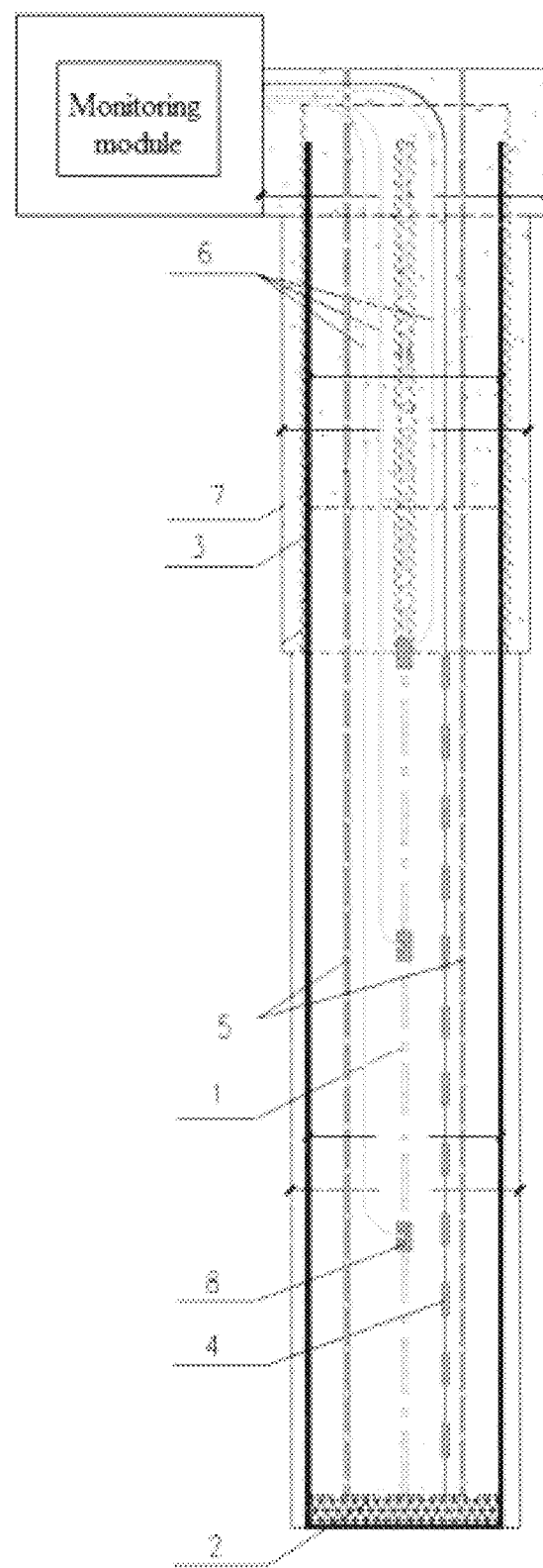
FIG. 3 is a schematic structural view of a monitoring system for a deep well grounding electrode monitoring system provided according to a second embodiment of the present disclosure.

In a specific embodiment, referring to FIG. 2, first, a kilometer deep well is drilled on the natural ground, the reaming technology is adopted from the surface to 50 m, the hole diameter is 630 mm, and the hole diameter of the well wall after cementing is 480 mm. For the lower part, the hole diameter of the well wall from 50 m to 400 m is 410 mm, and the hole diameter of the well wall at the bottom from 400 m to 1000 m is 380 mm. During the drilling process, an arm casing or mud is used to ensure that the well wall will not collapse or leak. After the drilling is completed, a steel casing (3) with a diameter of 340 mm is first lowered, the wall thickness is 10 mm, the total length of the steel casing (3) is 990 m, the first clearance distance is 10 m, the steel casing (3) is coated with an insulation anti-corrosion layer (7) from a depth of 400 m to the top and is protected by a PE casing. After the steel casing (3) is lowered in place, the feeding head (2) is lowered inside the steel casing (3), and the feeding head (2) is equipped with a grouting device. Then, the feeding rods (1) are lowered down and welded one by one, the feeding rods (1) are hollow steel pipes with a length of 950 m, the second clearance distance is 50 m, and the exothermic welding points are adopted to weld the drainage cables (6) at 400 m, 600 m, and 800 m of the feeding rod (1), and the drainage cables (6) are fixed on the feeding rods by bolts. The drainage cables (6) are all connected to a control center tower to ensure centralized control of the leaded current. The feeding rod (1) is insulated by an insulation casing (7) from 50 m to 400 m to perform insulation to the earth surface. During mounting the feeding rod (1), the optical fiber temperature measuring cable (4) (2) and the exhaust pipe (5) (3) are mounted simultaneously. The temperature measuring optical cable (4) is mainly configured to monitor and warn the temperature control situation of the full section of the deep well. The double-row exhaust pipe (5) is mainly configured to prevent gas from being generated in the well when the feeding rod (1) is draining, so as to prevent the occurrence of the "gas resistance phenomenon". The temperature measuring optical cable (4) and the exhaust pipe (5) are fixed to the feeding rods (1) by bolts. After the feeding rods (1), the drainage cables (6), the temperature measuring optical cable (4), and the exhaust pipe (5) are all mounted, equipment performance debugging and testing are carried out, and coke slurry grouting is carried out after passing the test. A hole bottom grouting method is adopted, and the deep well coke slurry is pumped by the feeding rods (1) and the grouting device of the feeding head (2), so that the diffusing section (400 m-1000 m) of the deep well is filled with coke. After the coke has fulfilled the diffusing section, the insulation section (0 m-400 m) is filled with gravel, and the gravel are filled to the natural ground for reclamation and vegetation restoration.

A monitoring system for the deep well grounding electrode is provided according to the second embodiment of the present disclosure, and the monitoring system includes the deep well grounding electrode according to any item in the first embodiment of the present disclosure, and further includes the monitoring module;

the monitoring module includes a downhole grouting control unit, a downhole exhaust control unit and a downhole temperature monitoring unit;

the downhole grouting control unit is configured to control the grouting device to grout;

the downhole exhaust control unit is configured to control the exhaust pipe to exhaust gas;

the downhole temperature monitoring unit is configured to monitor downhole temperature data collected by the temperature measuring optical cable, and provide an early warning according to a preset temperature threshold.

Preferably, coke slurry is pumped by the grouting device of the feeding head (2); the ratio of water to graphite of the coke slurry pumped this time ranges from 1:1 to 1:1.2, and the density of the coke slurry ranges from 1.20 to 1.40 $g/cm^3$, and the grouting pressure ranges from 8 to 12 MPa. The downhole grouting unit will be fully filled the coke slurry in the diffusing section, including a space between the steel casing (3) and the well wall, a space between the feeding rod (1) and the steel casing (3) and the interior space of the feeding rod (1).

Compared with the prior art, the deep well grounding electrode and the monitoring system for the deep well grounding electrode provided by the embodiments of the present disclosure have the following beneficial effects:

1. A deep borehole is isolated into an upper insulation section and a lower diffusing section, and a low-carbon alloy steel feeding rod of the same length as the borehole depth is adopted to lead the current to the bottom of the borehole. Insulating treatment is performed on the upper part of the feeding rod to form the insulation section, and the diffusing section is controlled to reduce the diffusion of surface stray currents; coke mixture is injected into the diffusing section in the deep well by grouting at the bottom of the deep well, and an electron circulation path is established between the feeding rod and the stratum by the coke; the perforated exhaust pipe is designed to be wound with geotextile so as to discharge the gas generated during feeding process at the bottom of the well in order to prevent the occurrence of "gas resistance phenomenon"; current in the DC electricity transmission can be quickly lead from one end (e.g. a receiving end) to a layer deep in the earth with good conductivity, and conducted through the deep part of the earth, and then transmitted out from the other end (e.g. a sending end) so as to form a current circulation loop; the inflow and outflow of the current in DC electricity transmission in the shallow layer of the earth are both realized by the feeding rod; after an insulating treatment to the upper part of the feeding rod, the current cannot diffuse directly to the earth surface from the feeding rod, and a high resistance layer covered on the diffusing section can prevent the current in deep layer from flowing into the earth surface, so that a small surface diffusion current and a low potential difference in a large range can be realized, thereby greatly reducing the impact of the grounding electrode on environment of the earth surface;

2. The temperature measuring optical cable is configured to monitor the temperature rise in the downhole during the feeding process. The downhole temperature monitoring unit is configured to automatically alarm when the temperature reaches a preset temperature threshold, and prompt to stop the power operation; the downhole grouting control unit and the downhole exhaust control unit are configured to control the downhole grouting and downhole exhaust, respectively, so as to ensure the stability and safety of the deep well grounding electrode.

It should be noted that the apparatus embodiments described above are merely illustrative. A unit described as a separate component may be or may not be physically separated, and a component displayed as a unit may be or may not be a physical unit, that is, it may be placed in a same position or may be distributed in multiple networked units. As needed, some or all of the modules may be selected to implement the embodiments of the present disclosure. In addition, in the drawings of the embodiments of the device provided in the present disclosure, the connection relation between the modules indicates that there is a communication connection between the modules, and may be embodied as one or more communication buses or signal lines. Those skilled in the art can understand and practice the present disclosure without paying any creative work.

The above description is only preferable embodiments of the present disclosure. It should be noted that those skilled in the art can make improvements and modifications without departing from the principle of the present disclosure. These improvements and modifications should also fall within the protection scope of the present disclosure.

The invention claimed is:

1. A deep well grounding electrode, located in a well body, wherein the deep well grounding electrode comprises a feeding rod, a feeding head, a steel casing with a diameter less than a bore diameter of the well body, a temperature measuring optical cable, an exhaust pipe and a drainage cable;

the steel casing is located inside the well body, a distance between the top of the steel casing and the ground is defined as a first clearance distance, and the steel casing is coated with an insulation and anti-corrosion layer from a certain depth of the deep well to the top of the steel casing;

the feeding head is located at the bottom of the steel casing, and the feeding head comprises a grouting device configured to pump coke slurry;

the feeding rod, the temperature measuring optical cable, the exhaust pipe and the drainage cable are located inside the steel casing;

a distance between the top of the feeding rod and the ground is defined as a second clearance distance, and the feeding rod extends by the second clearance distance from the bottom of the steel casing;

the temperature measuring optical cable extends from the bottom end of the feeding rod to a monitoring module;

the exhaust pipe extends from the bottom end of the feeding rod to the ground;

one end of the drainage cable is welded to the feeding rod by an exothermic welding point, and the other end the drainage cable extends to the monitoring module, and the drainage cable is fixed on the feeding rod by a bolt, wherein the certain depth of the deep well is defined as an insulation depth, a section of the deep well grounding electrode from the ground to the insulation depth is defined as an insulation section, and a section of the deep well grounding electrode from the insulation depth to the bottom of the steel casing is defined as a diffusing section; the insulation section is filled with gravel and the diffusing section is filled with coke.

2. The deep well grounding electrode according to claim 1, wherein the bottom of the steel casing is a perforated flower tube structure.

3. The deep well grounding electrode according to claim 1, wherein an anti-corrosion casing is covered on the outside of the insulation and anti-corrosion layer, and the anti-corrosion casing is a PE casing.

4. The deep well grounding electrode according to claim 3, comprising three drainage cables, each of which shares ⅓ of a rated grounding current value;

the three cables are exothermic welded with the feeding rod at three depths of 400 m, 600 m and 800 m of the well body, respectively, and the exothermic welding points are sealed with lead and coated with epoxy resin.

5. The deep well grounding electrode according to claim 4, wherein the temperature measuring optical cable is fixed on the feeding rod by a hoop.

6. The deep well grounding electrode according to claim 5, further comprising an insulation casing, wherein the insulation casing is covered on the feeding rod.

7. A deep well grounding electrode monitoring system, comprising the deep well grounding electrode, the deep well grounding electrode is located in a well body, wherein the deep well grounding electrode comprises a feeding rod, a feeding head, a steel casing with a diameter less than a bore diameter of the well body, a temperature measuring optical cable, an exhaust pipe and a drainage cable;

the steel casing is located inside the well body, a distance between the top of the steel casing and the ground is defined as a first clearance distance, and the steel casing is coated with an insulation and anti-corrosion layer from a certain depth of the deep well to the top of the steel casing;

the feeding head is located at the bottom of the steel casing, and the feeding head comprises a grouting device configured to pump coke slurry;

the feeding rod, the temperature measuring optical cable, the exhaust pipe and the drainage cable are located inside the steel casing;

a distance between the top of the feeding rod and the ground is defined as a second clearance distance, and the feeding rod extends by the second clearance distance from the bottom of the steel casing;

the temperature measuring optical cable extends from the bottom end of the feeding rod to a monitoring module;

the exhaust pipe extends from the bottom end of the feeding rod to the ground;

one end of the drainage cable is welded to the feeding rod by an exothermic welding point, and the other end the drainage cable extends to the monitoring module, and the drainage cable is fixed on the feeding rod by a bolt, wherein the certain depth of the deep well is defined as an insulation depth, a section of the deep well grounding electrode from the ground to the insulation depth is defined as an insulation section, and a section of the deep well grounding electrode from the insulation depth to the bottom of the steel casing is defined as a diffusing section; the insulation section is filled with gravel and the diffusing section is filled with coke, wherein the deep well grounding electrode monitoring system further comprises the monitoring module;

wherein the monitoring module comprises a downhole grouting control unit, a downhole exhaust control unit and a downhole temperature monitoring unit;

the downhole grouting control unit is configured to control the grouting device to grout;

the downhole exhaust control unit is configured to control the exhaust pipe to exhaust gas;

the downhole temperature monitoring unit is configured to monitor downhole temperature data collected by the temperature measuring optical cable, and provide an early warning according to a preset temperature threshold.

8. The deep well grounding electrode monitoring system according to claim 7, wherein the bottom of the steel casing is a perforated flower tube structure.

9. The deep well grounding electrode monitoring system according to claim 7, wherein an anti-corrosion casing is covered on the outside of the insulation and anti-corrosion layer, and the anti-corrosion casing is a PE casing.

10. The deep well grounding electrode monitoring system according to claim 9, comprising three drainage cables, each of which shares $\frac{1}{3}$ of a rated grounding current value;

the three cables are exothermic welded with the feeding rod at three depths of 400 m, 600 m and 800 m of the well body, respectively, and the exothermic welding points are sealed with lead and coated with epoxy resin.

11. The deep well grounding electrode monitoring system according to claim 10, wherein the temperature measuring optical cable is fixed on the feeding rod by a hoop.

12. The deep well grounding electrode monitoring system according to claim 11, further comprising an insulation casing, wherein the insulation casing is covered on the feeding rod.

* * * * *